United States Patent

[11] 3,550,522

| [72] | Inventors | Edward J. Bauer<br>1948 Dartmore St., Pittsburgh, Pa. 15210;<br>Jack N. Bauer, 11309 Clematis Blvd.,<br>Pittsburgh, Pa. 15235 |
|------|-----------|---|
| [21] | Appl. No. | 795,013 |
| [22] | Filed | Jan. 29, 1969 |
| [45] | Patented | Dec. 29, 1970 |

[54] TELESCOPIC, PORTABLE TEMPERATURE CONTROL UNIT FOR THE REAR SEAT PORTION OF AN AUTOMOBILE
6 Claims, 2 Drawing Figs.

| [52] | U.S. Cl. | 98/2 |
|------|----------|------|
| [51] | Int. Cl. | B60h 1/24 |
| [50] | Field of Search | 98/2; 237/12.3 |

[56] References Cited

UNITED STATES PATENTS

| 2,996,255 | 8/1961 | Boylan | 98/2.4 |
| 3,394,887 | 7/1968 | Megargle | 98/2 |

Primary Examiner—Meyer Perlin
Attorney—Fred C. Trenor, II

ABSTRACT: A telescopic, portable heating or cooling unit for the rear seat portion of an automobile, for use with conventional heating or cooling systems, has a feed duct, a telescopically attachable bifurcating duct, a pair of telescoping obtuse ducts and a pair of telescoping outlet ducts. The unit provides for the controlled passage of amounts of heated or cooled air to various portions of the rear seat area of automobiles by vent and baffle means and is readily transferred from one automobile to another.

PATENTED DEC29 1970 3,550,522

INVENTORS
EDWARD J. BAUER &
JACK N. BAUER 3,550,522

1

TELESCOPIC, PORTABLE TEMPERATURE CONTROL UNIT FOR THE REAR SEAT PORTION OF AN AUTOMOBILE

BACKGROUND OF THE INVENTION

Because of the enormous amount of time that people spend in their automobiles, numerous approaches have been made to provide the occupants of automobiles with more comfortable surroundings. Heaters and air-conditioning units are virtually standard equipment on automobiles, but such devices normally are associated with the front portion of the automobile and rear seat passengers of an automobile are insufficiently attended to. The systems that have been provided to give added comfort to rear seat passengers are generally expensive so that only the premium cars are equipped with, or adaptable to, such devices. Another problem exists in that such systems are generally complex and intricately attached to an automobile so that, when the automobile is sold by an owner, the system is included with the automobile, and the vendor must then purchase a second system for use with a new automobile. For example, the rear seat heater described in U.S. Pat. No. 3,394,887, although it may operate efficiently, would be so attached to the automobile in which it was first installed that it would, in all probability, remain in the automobile after the initial user sold the same. Also, systems that are provided for the rear seat heating or cooling of air for automobiles need to be custom fitted to a particular automobile, because of the various styles and areas thereof and are not transferable to other automobiles. Thus, the need has existed for a simplified, portable, and economical system for the provision of heated or cooled air to the rear portion of an automobile for use with any style or make of automobile.

In accordance with the present invention, an economical, portable heating or cooling unit is provided for controlling the temperature of the rear portion of an automobile. The portable unit is adaptable to numerous styles of automobiles and can be readily transferred from one automobile to another if so desired.

SUMMARY OF THE INVENTION

A telescopic, portable heating unit for the rear portion of an automobile, useful with conventional heating or cooling means is provided, having a feed duct adjacently attached to the heating or cooling means, and a bifurcating duct, telescopically attached thereto. The bifurcating duct divides the stream of air from the feed duct into two streams which exit into a pair of obtuse telescopically attached ducts. The obtuse ducts carry the air towards the rear portion of the vehicle and into a pair of outlet ducts, telescopically attached to the obtuse ducts, which direct the temperature controlled air to the rear portion of the automobile. Vents may be provided in the feed duct for exit of air to the front portion of the automobile and a baffle in the feed duct can control the amount of flow through the feed duct and the vents. Baffles can also be provided in the outlet ducts to enable the control of the amount of air to either side of the rear seat portion of the automobile.

The objects and novel features of the invention are described by the following detailed description when the same is read in connection with the accompanying drawing. It is to be expressly understood, however, that the drawing is not intended as a definition of the invention, but is for the purpose of illustration only.

DETAILED DESCRIPTION

Figure 1:
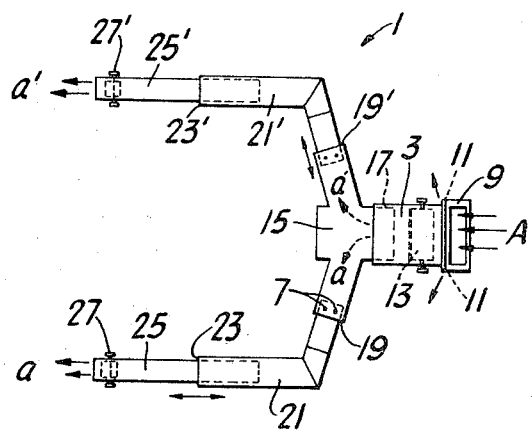
FIG. 1 is a top plan view of the assembled unit of the present invention.

In FIG. 1, there is illustrated the unit 1, the present invention, having a feed duct 3, the mouth 9 of the feed duct 3 adapted for connection to a conventional temperature control unit of a vehicle such as a heater 5 (FIG. 2) or an air cooling unit. Although the unit of the present invention is adaptable to be used with a heating or cooling device, for simplicity, a heater will be used throughout the following description. The feed duct 3 is attached by suitable attachment means, herein illustrated as bolts 7, to the conventional heater of an automobile. The feed duct 3 can have therein vents 11 and 11' for passage of heated air therethrough and a baffle means, illustrated herein as a baffle plate 13 to regulate the amount of flow of heated air through the vents and feed duct.

Telescopically attached to the feed duct 3 by suitable rib, slide, or other telescoping means is a bifurcating duct 15, with the mouth 17 thereof accepting heated air from feed duct 3. The telescopically attached bifurcating duct 15 has two exits therefrom, 19 and 19', whereby the heated air fed to the mouth 17 will be exited in two streams which then, in turn, pass from exits 19 and 19'.

Attached telescopically to the bifurcating duct 15 are a pair of obtuse ducts 21 and 21'. One of each of the pair of obtuse ducts 21 and 21' is telescopically attached to the exit portion 19 and 19', of the bifurcating duct 15, and extends away from the feed duct 3, so as to direct a flow of heated air to the rear portion of the automobile and away from feed duct 3. The obtuse ducts 21 and 21', in turn, have exits 23 and 23' to which there are telescopically attached outlet ducts 25 and 25' which carry the heated air streams to the desired portion of the rear seat area of the automobile. Provided in outlet ducts 25 and 25' are also baffle means, herein illustrated as baffle plates 27 and 27', to control the amount of flow of heated air to their respective portions of the rear seat area of the automobile.

In operation, the heated air A from a conventional heating system for automobiles is fed into feed duct 3. With baffle means 13 in a closed position, the entire flow of heated air will be directed to the front portion of the vehicle, as would be desirable where the rear seat portion is unoccupied. Should the provision of heated air to the rear portion of the automobile be desired, the baffle means 13 of feed duct 3 is opened to any desired position and will allow the passage of the heated air A through feed duct 3, and into mouth 17 of the bifurcating duct. The stream is thus divided into two streams $a$ and $a'$. Following the flow of stream $a$ (FIG. 2), the heated stream passes from exit opening 19 into obtuse duct 21 and is directed away from the feed means 3 and towards the rear portion of the automobile. From obtuse duct 21, the air flows through exit 23 into outlet duct 25 and therethrough to the rear portion of the vehicle and rear seat 37.

Should the occupant of the rear seat area adjacent outlet duct 25 desire less flow of heated air $a$, baffle means 27 is adjusted to the desired position so as to regulate the flow. Such an adjustment is especially useful where a single passenger occupies the rear seat and the entire flow of heated air to the rear seat position can be directed to the position of the rear seat occupant by closing the baffle means of the outlet duct to the unoccupied portion of the rear seat area. The adjustment of the various baffle means, to control the air flow to various portions of the rear seat area can be manual or, of course, simple electrical means can be provided, operating through the automobile electrical system, to provide automatic adjustment by the driver or passenger of the automobile and would be an obvious modification of the present invention.

Figure 2:
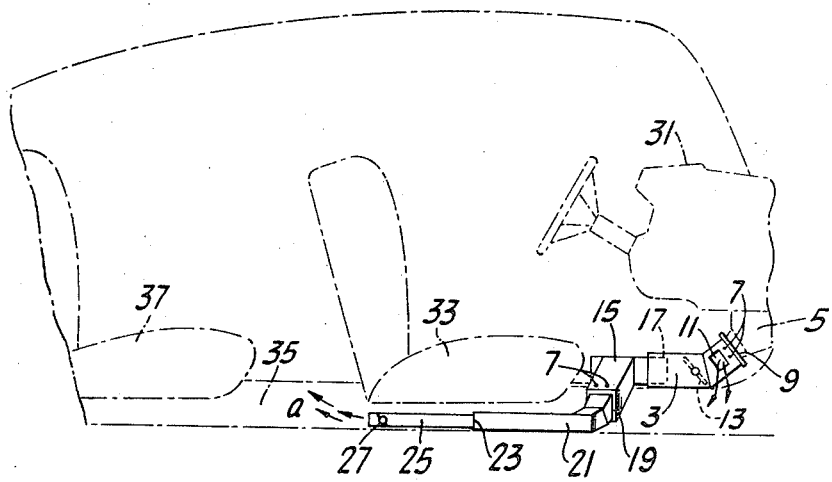
FIG. 2 is a sectional side view of an automobile with the unit of the present invention in operative relation to the automobile interior.

As seen in FIG. 2, the feed means 3 is attached to conventional heater 5, generally located beneath the dash 31 of the automobile. The bifurcating duct 15 can be so designed that it will fit beneath the front portion of front seat 33 and the obtuse duct 21 and outlet duct 25 positioned beneath front seat 33. The entire unit can be attached to the floor 35 of the automobile by any suitable means if desired to prevent movement thereof after installation.

Should the automobile owner, having a unit according to the present invention in the automobile, desire to retain the unit upon sale of the automobile or desire to transfer the unit to a second automobile, the unit is detached from the floor of the automobile and transferred. Since the telescoping features of the unit enable rearrangement of the dimensions thereof, the unit can be transferred from a large size automobile to a smaller size, or vice versa, and will operate efficiently and economically therein.

The unit can be fabricated from any suitable material that will withstand the temperature changes, such as stainless steel, aluminum, plastic material such as impact styrene polymer, and the like, and can be dyed, painted, or decorated to suit the interior of the automobile and the user's taste.

The dimensions of the unit can be varied over a wide range with the specific dimensions determined by use and economic considerations.

The foregoing has described a novel and efficient portable heating or cooling unit for controlling the temperature of the rear seat area of an automobile that is adaptable to any size or make of automobile and can be readily transferred from one automobile to another economically and easily. The unit provides for controlled flow of temperature-controlled air to various portions of the rear seat area and can be attached to conventional heating or cooling means associated with automobiles.

We claim:

1. An adaptable and portable temperature control unit for use in the interior of any automobile having a forward and a rearward passenger compartment in which said forward compartment a heating or cooling system is disposed for producing a stream of heated or cooled air; said temperature control unit being in operative association with said heating or cooling system for distributing the stream of heated or cooled air into said forward and rearward passenger compartments comprising:

a. an attachable and rigid feed duct of a generally rectangular cross-sectional configuration for receiving the stream of air from said system; one end of said feed duct having an attachment means for attaching said feed duct to said system so that said feed duct extends in a generally rearward direction from said system, said feed duct having vents therein for the exit of a portion of the stream of air into said forward compartment;
   b. a telescopically attachable and rigid bifurcated duct for receiving the remaining portion of the stream of air and dividing it into two equal streams of air having:
      1. an entrance duct of a generally rectangular cross-sectional configuration being telescopically attached to the other end of said feed duct such that said bifurcated duct may be positioned relative to said feed duct to extend from said feed duct in a generally rearward direction, and
      2. two exit ducts of a generally rectangular cross-sectional configuration that diverge from each other, extending in a generally lateral and rearward direction from said entrance duct,
   c. a pair of telescopically attachable and rigid obtuse ducts of a generally rectangular cross-sectional configuration for conveying the divided streams of air from each of said exit ducts of said bifurcated duct; each of said obtuse ducts being telescopically attached to one of said exit ducts of said bifurcated duct so that said obtuse ducts may be positioned relative to said bifurcated duct; said obtuse ducts extending laterally and rearwardly from said bifurcated duct then bending at an obtuse angle to extend in a generally rearward direction from said bifurcated duct; and
   d. a pair of telescopically attachable and rigid outlet ducts of a generally rectangular cross-sectional configuration for directing the divided streams of air into said rearward passenger compartment; each of said outlet ducts being telescopically attached to one of said obtuse ducts so that said outlet ducts may be coaxially positioned relative to said obtuse ducts and extend rearwardly therefrom into said rearward passenger compartment.

2. The adaptable and portable temperature control unit of claim 1 wherein said feed duct has a baffle means disposed therein and operatively associated therewith to control the flow of air through said vents into said forward passenger compartment.

3. The adaptable and portable temperature control unit of claim 1 wherein each of said outlet ducts have baffle means disposed therein and operatively associated therewith to control the flow of air into said rearward passenger compartment.

4. In combination, an automobile having a front and a rear seat compartment and having a source of a stream of heated or of cooled air disposed in said front seat compartment; an adaptable and portable temperature control means for directing portions of said heated or cooled air to said front and rear seat compartments comprising:

a. an attachable and rigid feed duct for receiving the stream of air from said source being positioned adjacent to said source; said feed duct having vents therein for the exit of a portion of the stream of air into said front seat compartment;
   b. a telescopically attachable and rigid bifurcated duct having an entrance duct and two exit ducts for dividing the remaining portion of air into two streams of air; said entrance duct being telescopically attached to said feed duct such that said bifurcated duct may be positioned relative to said feed duct; said exit ducts diverging outwardly from each other and extending laterally and rearwardly toward said rear seat compartment;
   c. a pair of telescopically attachable and rigid obtuse ducts for conveying the streams of air from said exit ducts of said bifurcated duct; each of said obtuse ducts having one end telescopically attached to one of said exit ducts and its other end extending rearwardly therefrom toward said rear seat compartment such that each of said obtuse ducts may be positioned relative to its exit duct of said bifurcated duct; and
   d. a pair of telescopically attachable and rigid outlet ducts for directing the streams of air into said rear seat compartment; each of said outlet ducts being telescopically attached to one of said obtuse ducts and extending rearwardly therefrom toward said rear seat compartment such that each of said outlet ducts may be coaxially positioned relative to its obtuse duct.

5. The combination of claim 4 wherein said feed duct has a baffle means therein and operatively associated therewith to control the flow of air through said vents and said feed duct.

6. The combination of claim 4 wherein each of said outlet ducts have baffle means disposed therein and operatively associated therewith to control the flow of air into said rear seat compartment.